United States Patent
Ferrin et al.

(10) Patent No.: US 11,299,824 B2
(45) Date of Patent: Apr. 12, 2022

(54) SELECTIVE CONTROL OF OXIDATION ATMOSPHERES IN CARBON FIBER PRODUCTION

(71) Applicant: Hexcel Corporation, Dublin, CA (US)

(72) Inventors: Peter Andrew Ferrin, South Jordan, UT (US); Devon Cadwaladar Todd Thomas, Sandy, UT (US)

(73) Assignee: HEXCEL CORPORATION, Dublin, CA (US)

( * ) Notice: Subject to any disclaimer, the term of this patent is extended or adjusted under 35 U.S.C. 154(b) by 337 days.

(21) Appl. No.: 16/546,990

(22) Filed: Aug. 21, 2019

(65) Prior Publication Data
US 2021/0054538 A1 Feb. 25, 2021

(51) Int. Cl.
*D01F 9/22* (2006.01)
*C01B 32/05* (2017.01)
*D01F 9/32* (2006.01)

(52) U.S. Cl.
CPC .............. *D01F 9/22* (2013.01); *C01B 32/05* (2017.08); *D01F 9/328* (2013.01)

(58) Field of Classification Search
CPC ... D01F 9/22; D01F 9/328; D01F 6/18; D01F 9/225; C01B 32/05; D01D 10/02
See application file for complete search history.

(56) References Cited

U.S. PATENT DOCUMENTS

| | | |
|---|---|---|
| 4,001,382 A | 1/1977 | Matsumura et al. |
| 4,009,248 A | 2/1977 | Kishimoto et al. |
| 4,397,831 A | 8/1983 | Saito et al. |
| 4,452,860 A | 6/1984 | Obama et al. |
| 5,004,590 A | 4/1991 | Schimpf |
| 5,256,344 A | 10/1993 | Schimpf |
| 9,121,112 B2 | 9/2015 | Leon y Leon |
| 2008/0118427 A1* | 5/2008 | Leon y Leon ............ D01F 9/12 423/447.2 |

FOREIGN PATENT DOCUMENTS

JP    H6-264311 A    9/1994

OTHER PUBLICATIONS

Wu, et al., Effect of moisture on stabilization of polyacrylonitrile fibers, Journal of Materials Science 2004; 39: 2959-2960 (Year: 2004).*

* cited by examiner

*Primary Examiner* — Daniel C. McCracken
(74) *Attorney, Agent, or Firm* — W. Mark Bielawski

(57) ABSTRACT

A method for making carbon fiber in which the tensile strength of carbon fiber is increased without dehumidifying the ambient air that enters every oxidation oven in a multiple oxidation oven system. A positive effect on tensile strength is provided when ambient air entering only the first oven in a series of oxidation ovens is dehumidified. In addition, the ambient air entering the last oven is not dehumidified when one or more of the preceding oxidation ovens is operated with dehumidified air.

17 Claims, 1 Drawing Sheet

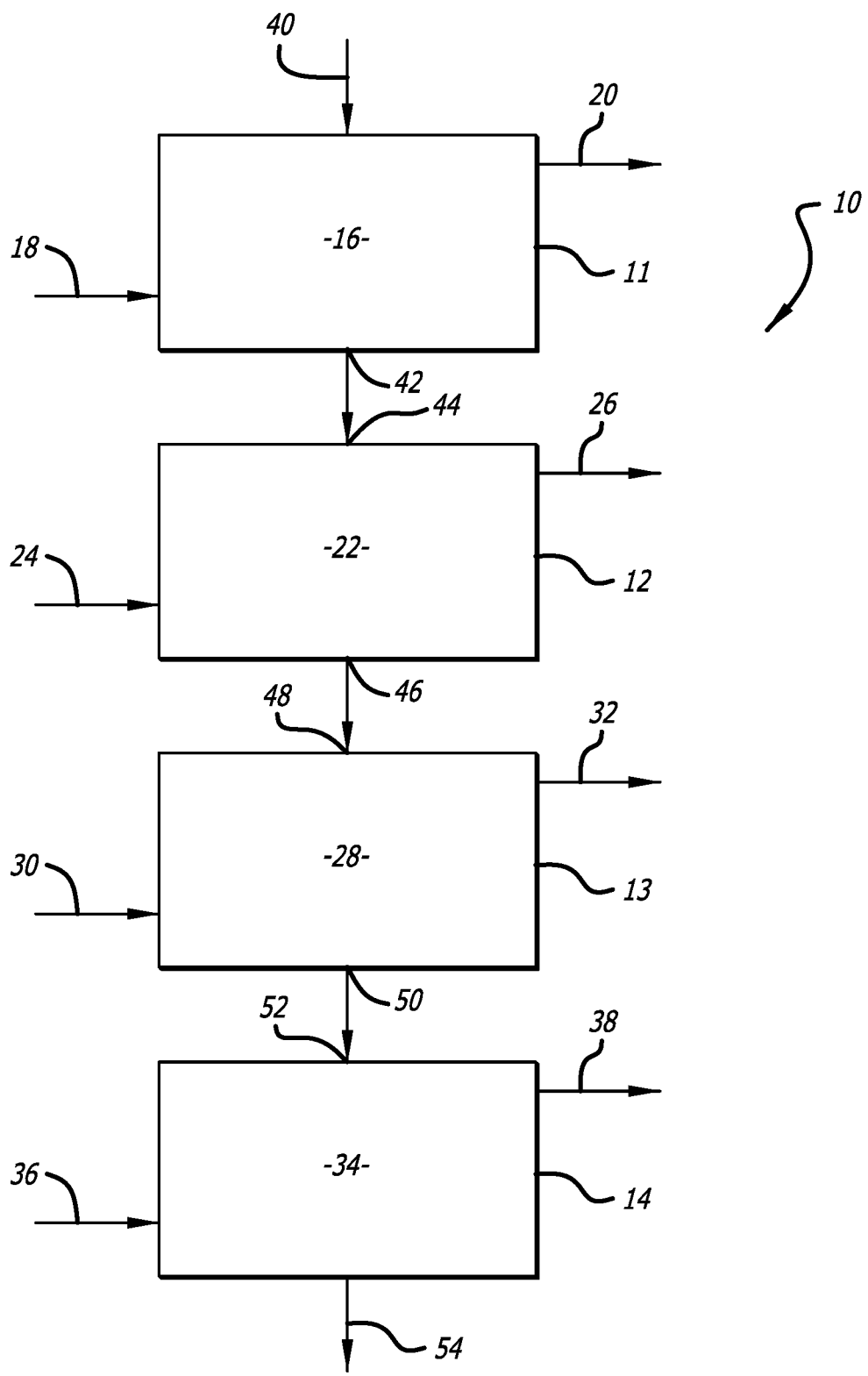

SELECTIVE CONTROL OF OXIDATION ATMOSPHERES IN CARBON FIBER PRODUCTION

BACKGROUND OF THE INVENTION

1. Field of the Invention

The present invention relates generally to methods for making carbon fiber. More particularly, the present invention involves selective control of humidity in the oxidation ovens used in such methods to minimize production costs without negatively affecting tensile strength of the carbon fiber.

2. Description of Related Art

Composite materials include a fibrous reinforcement structure and a resin matrix as the two principal components. Composite materials typically have a rather high strength to weight ratio. As a result, composite materials are used in the aerospace industry where the high strength and relatively light weight of composite structures are of particular importance.

Carbon fibers are a popular fibrous reinforcement for composite materials. Carbon fibers are typically provided as a multifilamentary yarn that is commonly referred to as a "tow". Carbon fiber tows typically contain from 1,000 to 50,000 individual filaments. Commercially available carbon fiber tows contain, for example, approximately 3000 filaments (3K), 6000 filaments (6K), 12000 (12K) filaments or 24000 (24K) filaments. The linear weight of a single carbon filament is typically in the range of from 0.02 to 0.5 milligrams per meter. Carbon filaments are also commonly referred to as carbon fiber.

. Carbon fiber is made by converting a precursor fiber, such as polyacrylonitrile (PAN) fiber, into a fiber that is at least 90% carbon. The conversion process involves heating the precursor fiber in an oxidizing atmosphere, such as air, to form an oxidized fiber, which is also referred to as a stabilized fiber. The oxidized fiber is further heated and carbonized in an inert atmosphere, such as nitrogen, in order to form the final carbon fiber.

In practice, the oxidation step is accomplished by passing the precursor fiber through a series of oxidation ovens that are maintained at temperatures of from 150° C. to 300° C. Ambient air surrounding the oxidation ovens is commonly used as the oxidation gas. Ambient air enters the oxidation ovens at several points including air entering the heater box prior to entry into the oxidation oven and air entering through gaps where the precursor fiber enters the oven. There may be additional sources of ambient air entering each oxidation oven depending upon the oven design and operation. Carbon fiber production lines generally include from two to six oxidation ovens. A typical production line utilizes four oxidation ovens.

It is known in the art that oxidation conditions, such as oven temperatures and residence times of the fiber both in the oxidation ovens and between the oxidation ovens, will affect the tensile strength of the resulting carbon fiber. Tensile strength is also affected by the atmospheres within the oxidation or stabilization ovens. For example, stabilization in a low oxygen atmosphere tends to reduce tensile strength of the carbon fiber. The humidity of the ambient air introduced into the oxidation ovens also affects tensile strength. For example, relatively humid ambient air having an absolute humidity of 12 gm water/Kg air and above, has been shown to have a negative effect on tensile strength. See Japanese Unexamined Patent Application Publication #H6-264311 published on Sep. 20, 1994.

An important goal in any carbon fiber production process is to provide carbon fiber with uniformly high tensile strength. This goal can be difficult to achieve when ambient air is used as the oxidation gas due to seasonal and/or daily variations in humidity. In order to obtain uniformly optimum tensile strengths in relatively high humidity environments (absolute humidity of 12 gm water/Kg air and above), one may have no choice but to dehumidify all ambient air before it enters the oxidation ovens. However, the cost, complexity and effort associated with such dehumidification systems is substantial. Accordingly, in order to ensure uniformly high tensile strengths, one is faced with the dilemma of either relocating the production facility to a drier climate or investing in expensive dehumidification systems. Even in a drier climate, there still is an issue with respect to possible fluctuations in tensile strength that may occur due to daily and/or seasonal changes in absolute humidity.

In drier climates, the absolute humidity will typically vary from 2 to 10 gm water/Kg air on a seasonal and/or daily basis. Little is known about the relationship, if any, between the tensile strength of carbon fiber and the absolute humidity of the ambient air used in the oxidation ovens when the absolute humidity fluctuates at such lower humidity levels.

It would be desirable to provide a method for making carbon fiber in drier climates where the humidity of the ambient air entering the oxidation ovens is reduced, if and where necessary, to produce carbon fiber having uniformly high tensile strength. It is further desirable that such a method limits the amount of ambient air that is dehumidified, as much as possible, to avoid the cost, complexity and effort associated with dehumidification of the ambient air entering multiple oxidation ovens.

SUMMARY OF THE INVENTION

In accordance with the present invention, it was discovered that the tensile strength of carbon fiber may be improved without dehumidifying the ambient air which enters every oxidation oven in a multiple oven system. Instead, it was discovered that dehumidification of ambient air entering only the first oven in a series of oxidation ovens provides a positive effect on tensile strength. In addition, it was discovered that dehumidification of ambient air entering the last oven in a series of oxidation ovens provides little improvement in tensile strength when each of the preceding ovens uses dehumidified air. These discoveries allow one to produce carbon fiber with a uniformly high tensile strength by dehumidifying the atmosphere of at least the first oxidation oven while avoiding the cost, complexity and effort associated with dehumidifying all oxidation ovens.

The present invention is based on a method for making carbon fiber from a precursor fiber wherein the precursor fiber is subjected to an oxidation treatment in a plurality of oxidation ovens to form an oxidized fiber. The oxidized fiber is then subjected to a carbonization treatment to form the carbon fiber. The oxidation ovens are surrounded by ambient air. At least a first oxidation oven is provided that defines a first oxidation zone having a first oxidation zone atmosphere. The first oxidation zone atmosphere is made up of first oxidation air that enters the first oxidation zone via one or more first oxidation air entrances. The first oxidation zone atmosphere has a first oxidation atmosphere humidity and the temperature or temperatures within the first oxidation zone fall within a first oxidation zone temperature range.

A final oxidation oven is provided that defines a final oxidation zone having a final oxidation zone atmosphere that is made up of ambient air which enters the final oxidation zone via one or more ambient air entrances. The ambient air has an ambient air humidity and the temperature or temperatures within the final oxidation zone fall within a final oxidation zone temperature range which is higher than the first oxidation zone temperature range.

As a feature of the invention, the first oxidation air is composed of dehumidified ambient air such that the first oxidation atmosphere humidity is less than the ambient air humidity. It was discovered that dehumidifying the first oxidation zone atmosphere alone provides an improvement in tensile strength of the carbon fiber that is made using multiple oxidation ovens.

As a further feature of the invention, when three or more oxidation ovens are used to provide oxidation of the precursor fiber, the oxidation air supplied to each of the oxidation ovens, except the final oxidation oven, is composed of dehumidified ambient air. It was discovered that a relatively small improvement in tensile strength is obtained by dehumidifying the ambient air entering the final oxidation zone in a series of three or more oxidation ovens. In many situations, such a small increase in tensile strength may not warrant the added cost, complexity and effort associated with dehumidifying the ambient air entering the final oxidation oven.

The present invention is directed towards methods for producing carbon fiber where multiple oxidation ovens are operated using ambient air as the oxidation gas. The invention provides an effective and efficient way to ensure that the carbon fiber has uniform tensile strength, which is as high as possible, even during upward fluctuations in absolute humidity of the ambient air. The invention is particularly well-suited for use in climates where the absolute humidity of ambient air in the carbon fiber production facility varies from 2 to 10 gm water/Kg air.

The above described and many other features and attendant advantages of the present invention will become better understood by reference to the following detailed description when taken in conjunction with the accompanying drawings.

BRIEF DESCRIPTION OF THE DRAWINGS

FIG. 1 is a diagrammatic representation of an exemplary oxidation treatment in accordance with the present invention

DETAILED DESCRIPTION OF THE INVENTION

The present invention is applicable to any of the processes or methods for making carbon fiber from a precursor fiber, such as polyacrylonitrile fiber. In general, such methods may include a variety of pre-treatments which may include stretching of the precursor fiber and/or the application of a finish oil. The treated precursor fiber is then fed through a plurality of oxidation ovens where it is oxidized in an oxygen-containing atmosphere to form oxidized precursor fiber. The oxidation step is also referred to as the stabilization step in which a stabilized precursor fiber is formed. The stabilized precursor fiber is then fed to one or more carbonization furnaces where it is carbonized in a high temperature inert atmosphere to form carbon fiber. Carbon fiber is typically composed of at least 90 weight percent carbon and preferably at least 92 weight percent carbon.

The present invention is directed to controlling the humidity in the oxidation atmospheres in a carbon fiber production method where a plurality of oxidation ovens is used to oxidize or stabilize the precursor fiber. The method may be used in combination with any typical precursor fiber, precursor pre-treatment step and any typical carbonization method.

An exemplary oxidation system is shown diagrammatically at 10 in FIG. 1. The oxidation system 10 includes a first oxidation oven 11, second oxidation oven 12, third oxidation oven 13 and fourth (final) oxidation oven 14. The following detailed description of the invention will be limited to preferred oxidation systems and methods that use four oxidation ovens. Oxidation systems and methods that use as few as two oxidation ovens and as many as six oxidation ovens are also suitable. The oxidations ovens used in a particular oxidation system and method are typically all the same or similar type and are operated in the same manner, except that the temperatures in the oxidation ovens typically increase from the first to last oven.

The first oxidation oven 11 defines a first oxidation zone 16 which has a first oxidation zone atmosphere. The first oxidation zone atmosphere is formed by first oxidation air that enters the first oxidation zone 16 through one or more first oxidation air entrances, as represented by arrow 18. First oxidation zone exhaust air exits the first oxidation oven 11 through suitable exhaust ports, as represented by arrow 20.

The primary entrance for the first oxidation air is through a first heater box (not shown) in which the oxidation air is heated prior to entry into the first oxidation zone 16. This type of oxidation air is referred to as "make-up" oxidation air. Other possible entrances for first oxidation air include gaps where the precursor fiber enters and exits the oven and edges or other locations in the oven that are not sealed. This type of oxidation air is referred to as "alternate" oxidation air.

The amount of alternate oxidation air entering the first oxidation zone 16 can be minimized by controlling pressure at the alternate air entrances. This can be done using fans and other devices known in the art. The amount of alternate oxidation air entering the first oxidation zone 16, is controlled so that the amount of first oxidation air entering the first oxidation zone 16 through the first heater box (first make-up air) is at least 60 volume percent of the total volume of first oxidation air entering the first oxidation zone 16. Preferably, at least 85 volume percent of the total volume of first oxidation air enters the first oxidation zone 16 through the heater box.

In accordance with the present invention, the first oxidation air is primarily composed of ambient air that has been dehumidified. For the purposes of this specification, ambient air is the atmosphere that is present within the carbon fiber production facility and which surrounds the oxidation ovens. The ambient air may or may not be air conditioned and the production facility may be open to the outside atmosphere to varying degrees. The ambient air typically includes air that is recycled from the oxidation ovens. Such recycled air can make up a substantial proportion of ambient air. The ambient air has an ambient air humidity that depends on a number of factors including the climate at the production facility, the proportion of recycled air surrounding the oxidation ovens and the humidity of the recycled air. When used in this specification, "humidity" means absolute humidity, unless otherwise specified. Absolute humidity, which is expressed as grams of water per kilogram of air (gm water/Kg air), is the water-vapor content of the atmosphere regardless of temperature.

The present invention may be used in production facilities where the humidity of the ambient air is relatively high (12 gm water/Kg air and higher). However, it is preferred that the humidity of the ambient air be in the range of 2 to 10 gm water/Kg air in order to ensure that the carbon fiber has uniformly high tensile strength. Ambient air having a humidity of from 2 to 6 gm water/Kg air is more preferred and most preferred is ambient air having a humidity of 2 to 4 gm water/Kg air.

The first oxidation zone 16 has a first oxidation zone atmosphere which has a first oxidation atmosphere humidity. The first oxidation atmosphere humidity is determined primarily by moisture in the make-up air and alternate air which enters the first oxidation zone 16. The first oxidation atmosphere humidity is also determined to a lesser extent by inherent moisture released from the precursor fiber and moisture produced by the oxidation reaction.

It is preferred that only the ambient air entering through the first heater box (make-up air) be dehumidified. This simplifies the dehumidification process, while still providing dehumidification of at least 60 volume percent (preferably at least 85 volume percent) of the total amount of first oxidation air entering the first oxidation zone 16. It is preferred that the ambient air is dehumidified prior to entering the first heater box.

Dehumidification of the ambient air entering the heater box may be accomplished using any type of dehumidifying system that is capable of removing moisture from large quantities of air. Suitable dehumidification systems include those which condense and/or absorb moisture from ambient air.

In accordance with the present invention, the ambient air entering the first oxidation zone through the first heater box (first make-up air) is dehumidified sufficiently to provide a first oxidation zone atmosphere that has an absolute humidity of from 1 to 3 gm water/Kg air, and preferably from 1 to 2 gm water/Kg air. The amount of moisture that must be removed from the ambient air passing through the first heater box (first make-up air) to provide the desired first oxidation atmosphere humidity depends on a number of factors including the relative amounts of make-up and alternate air, the amount of moisture being introduced into the oxidation oven by the precursor fiber and the humidity of the ambient air. The first make-up air is dehumidified sufficiently so that the first oxidation atmosphere humidity is at least 1 gm water/Kg air less than the ambient air. For example, if the ambient air humidity is 2, then the first oxidation atmosphere humidity will be 1 gm water/Kg air or less.

The higher the ambient air humidity, the higher the level of dehumidification that is required. For example, ambient air at an absolute humidity of 8 gm water/Kg air will need to be dehumidified to remove at least 5 to 7 gm water/Kg air in order to provide a first oxidation atmosphere humidity of 1 to 3 gm water/Kg air. As another example, ambient air at an absolute humidity of 4 gm water/Kg air will need to be dehumidified to remove at least 2 to 3 gm water/Kg air in order to provide a first oxidation atmosphere humidity in the preferred range of 1 to 2 gm water/Kg air.

The humidity of the first oxidation zone atmosphere is preferably substantially the same or slightly higher than the humidity of the dehumidified first oxidation air entering through the first heater box (first make-up air). This is accomplished by limiting, as much as possible, the amount of ambient air that enters the first oxidation zone 16 as alternate air. When 60 to 85 volume percent of the total amount of first oxidation air enters the first oxidation zone 16 through the first heater box as first make-up air, the humidity of the first oxidation zone atmosphere will be slightly higher than the humidity of the dehumidified first oxidation air entering through the first heater box (first make-up air). When 85 to 100 volume percent of the total amount of first oxidation air enters the first oxidation zone 16 through the first heater box (first make-up air), the humidity of the first oxidation zone atmosphere will be substantially the same as the humidity of the dehumidified first oxidation air entering through the first heater box (first make-up air), or at the most, 0.9 gm water/Kg air higher.

The second oxidation oven 12 defines a second oxidation zone 22 which has a second oxidation zone atmosphere. The second oxidation zone atmosphere is formed by second oxidation air that enters the second oxidation zone 22 through one or more second oxidation air entrances, as represented by arrow 24. Second oxidation zone exhaust air exits the second oxidation oven 12 through suitable exhaust ports, as represented by arrow 26.

The primary entrance for the second oxidation air is through a second heater box (not shown) in which the oxidation air is heated prior to entry into the second oxidation zone 22. As previously mentioned, this type of oxidation air is referred to as "make-up" oxidation air. Other possible entrances for second oxidation air include gaps where the precursor fiber enters and exits the oven and edges or other locations in the oven that are not sealed. As previously mentioned, this type of oxidation air is referred to as "alternate" oxidation air.

In accordance with the present invention, it is preferred that the second oxidation air is primarily composed of ambient air that has been dehumidified in order to provide carbon fiber having tensile strength that is as uniform and as high as possible. However, the second oxidation air may be composed primarily of ambient air in those situations where a slight reduction in tensile strength (less than 3 percent) can be tolerated in order to eliminate the cost, complexity and effort associated with dehumidifying the ambient air that enters the second oxidation oven.

When ambient air is to be dehumidified, the second oxidation oven 12 is operated in the same manner as the first oxidation oven 11, so that the amount of alternate oxidation air entering the second oxidation zone 22 is minimized by controlling pressure at the alternate air entrances. This can be done using fans and other devices known in the art. The amount of alternate oxidation air entering the second oxidation zone 22, is controlled so that the amount of second oxidation air entering the second oxidation zone 22 through the second heater box (second make-up air) is at least 60 volume percent of the total volume of second oxidation air entering the second oxidation zone 22. Preferably, at least 85 volume percent of the total volume of second oxidation air enters the second oxidation zone 22 through the second heater box (second make-up air).

Dehumidification of the ambient air entering the second oxidation zone 22 (second make-up air) is accomplished in the same manner as described previously for the first oxidation oven. Accordingly, the ambient air entering the second oxidation zone 22 through the second heater box is dehumidified sufficiently to provide a second oxidation atmosphere that has an absolute humidity of from 1 to 3 gm water/Kg air, and preferably from 1 to 2 gm water/Kg air. The amount of moisture that must be removed from the ambient air to form the second make-up air also depends on the relative amounts of make-up and alternate air, the amount of moisture being introduced into the oxidation oven by the precursor fiber and the humidity of the ambient air. The second oxidation atmosphere humidity should be at least 1 gm water/Kg air less than the ambient air and may be as much as 9 gm water/Kg air less than ambient air humidity.

When ambient air entering the second oxidation oven is dehumidified, the humidity of the second oxidation zone atmosphere is preferably substantially the same or slightly higher than the humidity of the dehumidified second oxidation air entering through the second heater box (second make-up air). This is accomplished in the same manner as the first oxidation oven by limiting, as much as possible, the amount of ambient air that enters the second oxidation zone 22 as alternate air. When 60 to 85 volume percent of the total amount of second oxidation air enters the second oxidation zone 22 through the second heater box as second make-up air, the humidity of the second oxidation zone atmosphere will be slightly higher than the humidity of the dehumidified second oxidation air entering through the second heater box (second make-up air). When 85 to 100 volume percent of the total amount of second oxidation air enters the second oxidation zone 22 through the second heater box (second make-up air), the humidity of the second oxidation zone atmosphere will be substantially the same as, or at the most 0.3 gm water/Kg air higher than, the humidity of the dehumidified second oxidation air entering through the second heater box (second make-up air).

The third oxidation oven 13 defines a third oxidation zone 28 which has a third oxidation zone atmosphere. The third oxidation zone atmosphere is formed by third oxidation air that enters the third oxidation zone 28 through one or more third oxidation air entrances, as represented by arrow 30. Third oxidation zone exhaust air exits the third oxidation oven 13 through suitable exhaust ports, as represented by arrow 32.

The primary entrance for the third oxidation air is through a third heater box (not shown) in which the oxidation air is heated prior to entry into the third oxidation zone 28. As previously mentioned, this type of oxidation air is referred to as "make-up" oxidation air. Other possible entrances for third oxidation air include gaps where the precursor fiber enters and exits the oven and edges or other locations in the oven that are not sealed. As previously mentioned, this type of oxidation air is referred to as "alternate" oxidation air.

In accordance with the present invention, it is preferred that the third oxidation air is primarily composed of ambient air that has been dehumidified in order to provide carbon fiber having tensile strength that is as uniform and as high as possible. However, the third oxidation air may be composed primarily of ambient air in those situations where a slight reduction in tensile strength (less that 3 percent) can be tolerated in order to eliminate the cost, complexity and effort associated with dehumidifying the ambient air that enters the third oxidation oven.

When ambient air is to be dehumidified, the third oxidation oven 13 is operated in the same manner as the first oxidation oven 11, so that the amount of alternate oxidation air entering the third oxidation zone 28 (third make-up air) is minimized by controlling pressure at the alternate air entrances. This can be done using fans and other devices known in the art. The amount of alternate oxidation air entering the third oxidation zone 28, is controlled so that the amount of third oxidation air entering the third oxidation zone 28 through the third heater box (third make-up air) is at least 60 volume percent of the total volume of third oxidation air entering the third oxidation zone 28. Preferably, at least 85 volume percent of the total volume of third oxidation air enters the third oxidation zone 16 through the third heater box.

Dehumidification of the ambient air entering the third oxidation zone 28 is accomplished in the same manner as described previously for the first oxidation oven. Accordingly, the ambient air entering the third oxidation zone 28 through the third heater box is dehumidified sufficiently to provide a third oxidation atmosphere that has an absolute humidity of from 1 to 3 gm water/Kg air, and preferably from 1 to 2 gm water/Kg air. The amount of moisture that must be removed from the ambient air to form the third oxidation air depends on the relative amounts of make-up and alternate air, the amount of moisture being introduced into the oxidation oven by the precursor fiber and the humidity of the ambient air. The third oxidation atmosphere humidity should be at least 1 gm water/Kg air less than the ambient air and may be as much as 9 gm water/Kg air less than ambient air humidity.

When ambient air entering the third oxidation oven is dehumidified, the humidity of the third oxidation zone atmosphere is preferably substantially the same or slightly higher than the humidity of the dehumidified third oxidation air entering through the third heater box (third make-up air). This is accomplished in the same manner as the first oxidation oven by limiting, as much as possible, the amount of ambient air that enters the third oxidation zone 28 as alternate air. When 60-85 volume percent of the total amount of second oxidation air enters the third oxidation zone 28 through the third heater box as third make-up air, the humidity of the third oxidation zone atmosphere will be slightly higher than the humidity of the dehumidified third oxidation air entering through the third heater box (third make-up air). When 85 to 100 volume percent of the total amount of third oxidation air enters the third oxidation zone 28 through the third heater box (third make-up air), the humidity of the third oxidation zone atmosphere will be substantially the same as, or at the most 0.3 gm water/Kg air higher than, the humidity of the dehumidified third oxidation air entering through the third heater box.

The fourth and final oxidation oven 14 defines a fourth oxidation zone 34 which has a fourth oxidation zone atmosphere. The fourth oxidation zone atmosphere is formed by ambient air that enters the fourth oxidation zone 34 through one or more ambient air entrances, as represented by arrow 36. The fourth and final oxidation zone exhaust air exits the fourth oxidation oven 14 through suitable exhaust ports, as represented by arrow 38.

In accordance with the present invention, the ambient air entering the fourth oxidation zone 34 is not dehumidified. It was discovered that little, if any, improvement in producing carbon fiber with uniformly high tensile strength is obtained by dehumidifying the ambient air entering the fourth oxidation zone 34 as fourth make-up air. This is particularly the case, when the ambient air humidity is less than 10 gm water/Kg air, preferably less than 6 gm water/Kg air and most preferably less than 4 gm water/Kg air. In addition, at least the first oxidation air must be dehumidified as described previously. Preferably, the second and/or third oxidation air is also dehumidified.

A continuous precursor fiber, after any pre-treatment, is fed into the first oxidation zone 16 as represented by arrow 40. The precursor fiber can be any of the known fiber types that are suitable for making carbon fiber. Polyacrylonitrile is a preferred precursor fiber. Exemplary precursor fibers are described in U.S. Pat. Nos. 4,001,382; 4,009,248; 4,397, 831; and 4,452,860, the contents of which are hereby incorporated by reference.

The speed at which the precursor fiber is passed through the first oxidation zone is preferably such that the residence time of the precursor fiber within the first oxidation zone 16 (first oxidation time) is from 5 minutes to 1 hour. Preferably, the first oxidation time is from 10 to 40 minutes. The precursor fiber exits the first oxidation zone 16 as a partially oxidized fiber, as shown at 42.

The partially oxidized fiber is exposed to ambient air as it travels from the first oxidation zone exit 42 to the entrance 44 of the second oxidation zone 22. The residence time of the partially oxidized precursor in the ambient air between the first and second oxidation ovens (first ambient airtime) should be kept as short as possible for the particular type and design of oxidation ovens being used. First ambient airtimes of less than 8 minutes are suitable with ambient airtimes of 5 minutes or less being preferred.

The speed at which the partially oxidized fiber is passed through the second oxidation zone 22 is typically, but not necessarily, the same as the fiber speed through the first oxidation zone 16. The residence time of the partially oxidized fiber within the second oxidation zone 22 (second oxidation time) is also from 5 minutes to 1 hour and preferably 10 to 40 minutes.

The partially oxidized fiber exits the second oxidation zone 22 as a first further oxidized fiber, as shown at 46. The first further oxidized fiber is again exposed to ambient air as it travels from the second oxidation zone exit 46 to the entrance 48 of the third oxidation zone 28 (second ambient airtime). The second ambient airtime should also be kept as short as possible for the particular type and design of oxidation ovens being used. Second ambient airtimes of less than 8 minutes are suitable with second ambient airtimes of 5 minutes or less being preferred.

The speed at which the first further oxidized fiber is passed through the third oxidation zone 28 is typically, but not necessarily, the same as the fiber speeds through the first and second oxidation zones 16 and 22. It is preferred that the residence time of the first further oxidized fiber within the third oxidation zone 28 (third oxidation time) is also from 5 minutes to 1 hour and preferably 10 to 40 minutes The first further oxidized fiber exits the third oxidation zone 28 as a second further oxidized fiber, as shown at 50. The second further oxidized fiber is again exposed to ambient air as it travels from the third oxidation zone exit 50 to the entrance 52 of the fourth and final oxidation zone 34 (third ambient airtime). The third ambient airtime should also be kept as short as possible for the particular type and design of oxidation ovens being used. Third ambient airtimes of less than 8 minutes are suitable with third ambient airtimes of 5 minutes or less being preferred.

The speed at which the second further oxidized fiber is passed through the fourth oxidation zone 34 is also typically, but not necessarily, the same as the fiber speeds through the first, second and third oxidation zones 16, 22 and 28. It is preferred that the residence time of the second further oxidized fiber within the fourth oxidation zone 28 (fourth oxidation time) is also from 5 minutes to 1 hour and preferably 10 to 40 minutes.

The second further oxidized fiber exits the fourth oxidation zone 34 as the oxidized fiber, as shown at 54. The oxidized fiber is then passed to one or more carbonization furnaces, as is well known in the art, to convert the oxidized or stabilized fiber into the final carbon fiber. Any of the typical carbonization furnace systems and processes may be used to convert the oxidized fiber into carbon fiber. Such furnaces systems typically include multiple carbonization furnaces through which the oxidized fiber is sequentially passed. The carbonization ovens have inert atmospheres which are at sufficiently high temperatures to convert the oxidized fiber into carbon fiber.

The four oxidation ovens can be any of the oxidation oven types typically used in the production of carbon fiber from a precursor fiber. All four oxidation ovens are operated in accordance with typical carbon fiber production operating procedures where multiple oxidation ovens are utilized. The operating parameters for the four oxidation ovens are in accordance with a typical carbon fiber production line, except that the first make-up air entering the first oxidation oven is dehumidified ambient air as described previously. Preferably, the second and/or third make-up air entering the second and third oxidation ovens, respectively, is also dehumidified ambient air as described previously. The fourth oxidation oven is operated in the same manner as the first three oxidation ovens, except that the fourth make-up air is ambient air which has not been dehumidified.

The four oxidation ovens are operated at conventional oxidation/stabilization temperatures of from 150° C. to 300° C. (preferably 200° C. to 300° C.). As is well known, the temperature or temperatures in the ovens gradually increases from the first to the fourth oxidation oven. Exemplary oxidation/stabilization processes are described in U.S. Pat. Nos. 5,256,344 and 9,121,112, the contents of which is hereby incorporated by reference.

The temperature range for the first oxidation zone 16 is preferably from 200° C. to 250° C. It is preferred that the first oxidation zone 16 includes a first temperature sub-zone and a second temperature sub-zone where the precursor fiber is passed through the first temperature sub-zone before being passed through the second temperature sub-zone. The temperature of the second temperature sub-zone is from 1 to 20° C. higher than the temperature in the first temperature subzone. Preferably, the temperature of the second temperature sub-zone is from 1 to 10° C. higher than the temperature in the first temperature subzone.

The temperature range for the second oxidation zone 22 is preferably from 210° C. to 260° C. It is preferred that the second oxidation zone also includes a first temperature sub-zone and a second temperature sub-zone where the precursor fiber is passed through the first temperature sub-zone before being passed through the second temperature sub-zone. The temperature of the second temperature sub-zone is from 1 to 20° C. higher than the temperature in the first temperature subzone. Preferably, the temperature of the second temperature sub-zone is from 1 to 10° C. higher than the temperature in the first temperature subzone.

The temperature range for the third oxidation zone 28 is preferably from 220° C. to 265° C. It is preferred that the third oxidation zone also includes a first temperature sub-zone and a second temperature sub-zone where the precursor fiber is passed through the first temperature sub-zone before being passed through the second temperature sub-zone. The temperature of the second temperature sub-zone is from 1 to 20° C. higher than the temperature in the first temperature subzone. Preferably, the temperature of the second temperature sub-zone is from 1 to 10° C. higher than the temperature in the first temperature subzone.

The temperature range for the fourth oxidation zone 34 is preferably from 225° C. to 275° C. It is preferred that the fourth oxidation zone also includes a first temperature sub-zone and a second temperature sub-zone where the precursor fiber is passed through the first temperature subzone before being passed through the second temperature sub-zone. The temperature of the second temperature sub-zone is from 1 to 20° C. higher than the temperature in the first temperature subzone. Preferably, the temperature of the second temperature sub-zone is from 1 to 10° C. higher than the temperature in the first temperature subzone.

In accordance with the present invention, the exemplary oxidation method requires dehumidifying the make-up air that enters the first of four oxidation ovens in order to provide the advantage of carbon fiber having uniform tensile strength that is relatively high in comparison to carbon fiber made using the same four ovens without any dehumidification of make-up air. This advantage is provided without the cost, complexity and effort required to dehumidify the make-up air entering all four ovens. The present invention provides the additional advantage of eliminating the cost, complexity and effort associated with dehumidifying the make-up entering the final oxidation oven by requiring that the final make-up air is not humidified. This is based on the discovery that dehumidifying the make-up air entering the final oxidation oven provides little, if any, increase in the tensile strength of the carbon fiber when the make-up air entering the three preceding oxidation oven is dehumidified.

The above features of the invention provide the option of increasing uniform tensile strength as much as possible by dehumidifying the make-up air entering the first three ovens, while at the same time saving the cost and effort associated with unnecessarily dehumidifying the make-up air entering the final oxidation oven. Another option provided by the present invention is that one can dehumidify the make-up air entering only the first oxidation oven. This option substantially increases the tensile strength of carbon fiber, while only incurring the cost and effort associated with dehumidifying the first make-up air. This option requires that one is willing to accept a relatively small (5% or less) decrease in tensile strength of the carbon fiber, when compared to carbon fiber made where the make-up air entering three or more of the oxidation ovens is dehumidified.

Examples of practice are as follows:

Tests were conducted in which polyacrylonitrile precursor fiber was converted into carbon fiber using the same carbon fiber production line which was operated under similar conditions for all tests. The carbon fiber production line included four oxidation ovens which each defined an oxidation zone that included two temperature sub-zones. The second sub-zones were 1 to 10° C. hotter than the first subzones. For all tests, the temperatures within the first oxidation zone were between 230° C. and 250° C. The temperatures within the second oxidation zone were between 235° C. and 255° C. The temperatures within the third oxidation zone were between 245° C. and 260° C. The temperature within the final oxidation zone were between 250° C. and 265° C.

The speed at which the fiber was passed through the oxidation ovens provided an oxidation residence time of about 30 minutes for the precursor fiber within each of the oxidation zones. The precursor fiber was passed through ambient air between the first and second oxidation ovens, second and third oxidation ovens and third and fourth oxidation ovens. The speed at which the precursor fiber was passed through ambient air between the ovens provided an ambient air residence time of about 2 minutes between each of the oxidation oven pairs.

The pre-oxidation treatment for all precursor fibers, which included application of a finish oil, was the same. Carbonization of all test fibers was conducted in a series of furnaces under nitrogen at temperatures increasing from 350 up to 1450° C. The polyacrylonitrile precursor fiber used in all tests was 5 microns in diameter and had a denier of 0.8.

Various tests were run on the production line by selectively varying the oxidation atmosphere humidity in one or more of the four oxidation oven zones. The variations in oxidation atmosphere humidity were obtained by either dehumidifying ambient air entering the oxidation oven as make-up air, adding water to the ambient air entering the oxidation oven as make-up air or operating the oxidation oven using only ambient air. The humidity of the ambient air for all tests was about 3 grams water per kilogram of air (gm water/Kg air). When the ambient air was dehumidified before entering the oxidation oven(s) as make-up air, the amount of water removed from the ambient air was controlled so that the oxidation atmosphere(s) in the dehumidified oxidation zone(s) was about 1.4 gm water/Kg air. When water was added to the ambient air before entering the oxidation oven as make-up air (Test No. 6), the amount of water added to the ambient air to form humidified air was about 21 gm water/Kg air. The make-up air entering each of the four oxidation ovens was from 60 to 85 volume percent of the total amount of oxidation air (make-up air+alternate air) entering the oxidation oven.

Tensile strength of the carbon fibers was measured in accordance with the current version of ASTM D4018, as described in U.S. Pat. No. 5,004,590, the contents of which is hereby incorporated by reference. The results of the testing are set forth in TABLES 1 and 2.

The type of air used as the make-up air in each of the ovens is identified in the tables as either "Ambient Air", "Dehumidified Air" or "Humidified Air", which correspond respectively with the three air types, as described above.

TABLE 1

| Test No. | Tensile strength (MPa) | $1^{st}$ oven | $2^{nd}$ oven | $3^{rd}$ oven | $4^{th}$ oven |
|---|---|---|---|---|---|
| 1 | 5923 | Ambient Air | Ambient Air | Ambient Air | Ambient Air |
| 2 | 6138 | Dehumidified Air | Ambient Air | Ambient Air | Ambient Air |

In Test No. 1, all 4 oxidation ovens were operated using ambient air. In Test No. 2, the $1^{st}$ oxidation oven was operated with make-up air that was dehumidified air. The $2^{nd}$, $3^{rd}$ and $4^{th}$ oxidation ovens were operated with ambient air. The tensile strength of the carbon fiber produced in Test No. 2 was 215 MPa higher than the tensile strength of the carbon fiber produced in Test No. 1. These tests show that it is only necessary to dehumidify the make-up air entering the first of four oxidation ovens in order to provide an improvement in tensile strength of the carbon fiber.

TABLE 2

| Test No. | Percent Tensile strength | 1st oven | 2nd oven | 3rd oven | 4th oven |
|---|---|---|---|---|---|
| 3 | 97 | Dehumidified Air | Dehumidified Air | Ambient Air | Ambient Air |
| 4 | 99 | Dehumidified Air | Dehumidified Air | Dehumidified Air | Ambient Air |
| 5 | 100 | Dehumidified Air | Dehumidified Air | Dehumidified Air | Dehumidified Air |
| 6 | 81 | Humidified Air | Ambient Air | Ambient Air | Ambient Air |

In Test No. 6, the $2^{nd}$, $3^{rd}$ and $4^{th}$ oxidation ovens were operated using ambient air. Water was added to the make-up air (humidified air) for the $1^{st}$ oven so the absolute humidity of the $1^{st}$ oxidation oven atmosphere was well above the humidity of the $2^{nd}$, $3^{rd}$ and $4^{th}$ oxidation oven atmospheres. The increase in humidity in the $1^{st}$ oxidation oven alone resulted in a decrease the tensile strength of the carbon fiber to 81 percent of the tensile strength of fibers made according to Test No. 5. In Test No. 5, the ambient air entering all of the oxidation ovens as make-up air was dehumidified. These tests show that high humidity in only the first of the four oxidation ovens has a substantial negative effect on the tensile strength of the resulting carbon fiber.

In Test No. 3, the $1^{st}$ and $2^{nd}$ oxidation ovens were operated with dehumidified air as the make-up air and the $3^{rd}$ and $4^{th}$ oxidation ovens were operated with ambient air. The tensile strength of the carbon fiber produced in Test No. 3 was about 97% of the carbon fiber produced in Test No. 5. These tests show that it is only necessary to dehumidify the ambient air entering the first two of four oxidation ovens in order to provide carbon fiber that has a tensile strength which is only 3% less than the tensile strength of carbon fiber made when all four oxidation ovens are dehumidified.

In Test No. 4, the $1^{st}$, $2^{nd}$ and $3^{rd}$ oxidation ovens were operated with dehumidified air as the make-up air and the $4^{th}$ oxidation oven was operated with ambient air. The tensile strength of the carbon fiber produced in Test No. 4 was about 99% of the carbon fiber produced in Test No. 5. These tests show that it is only necessary to dehumidify the first three of four oxidation ovens in order to provide carbon fiber that has a tensile strength which is only 1% less than the tensile strength of carbon fiber made when the ambient air entering all four oxidation ovens is dehumidified.

The preceding tests demonstrate that using dehumidified air in the $1^{st}$ oxidation oven alone provides an increase in the tensile strength of the resulting carbon fiber. In addition, the tests demonstrate that dehumidifying the ambient air entering all four of the oxidation ovens provides little, if any, improvement in tensile strength over the tensile strength obtained when the ambient air entering only the first three of four oxidation ovens is dehumidified. The present invention recognizes these discoveries and provides a method where at least the ambient air entering the $1^{st}$ oxidation oven is dehumidified to provide increased tensile strength and wherein ambient air entering the final oxidation oven is not dehumidified in order to reduce the cost, complexity and effort associated with dehumidifying the final oxidation oven. This selective control of oxidation oven atmospheres provides the benefits of increasing tensile strength while at the same time reducing the cost, complexity and effort associated with dehumidifying the ambient air before it enters all of the oxidation ovens.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments but is only limited by the following claims.

What is claimed is:

1. A method for making carbon fiber from a precursor fiber wherein the precursor fiber is subjected to an oxidation treatment in a plurality of oxidation ovens to form an oxidized fiber, said oxidized fiber then being subjected to a carbonization treatment to form said carbon fiber, said plurality of oxidation ovens being surrounded by ambient air which has an ambient air humidity of from 2 to 10 grams of water per kilogram of air and wherein said oxidation treatment comprises the steps of:

providing at least a first oxidation oven that defines a first oxidation zone having a first oxidation zone atmosphere comprising first oxidation air which enters said first oxidation zone via one or more first oxidation air entrances, said first oxidation zone atmosphere having a first oxidation atmosphere, humidity wherein said first oxidation air comprises dehumidified ambient air such that said first oxidation atmosphere humidity is from 1 to 3 grams of water per kilogram of air and wherein said first oxidation atmosphere humidity is at least 1 gram of water per kilogram of air less than said ambient air humidity and wherein the temperature or temperatures within said first oxidation zone fall within a first oxidation zone temperature range;

passing said precursor fiber through said first oxidation zone to form a partially oxidized fiber;

providing a final oxidation oven that defines a final oxidation zone having a final oxidation zone atmosphere comprising said ambient air which enters said final oxidation zone via one or more ambient air entrances wherein the temperature or temperatures within said final oxidation zone fall within a final oxidation zone temperature range which is higher than said first oxidation zone temperature range;

passing said partially oxidized fiber through said final oxidation zone to form said oxidized fiber.

2. The method for making a carbon fiber according to claim 1 wherein said precursor fiber is a polyacrylonitrile fiber.

3. The method for making a carbon fiber according to claim 1 wherein said first oxidation zone temperature or temperatures are in the range of from 200° C. to 300° C. and wherein said final oxidation zone temperature or temperatures are in the range of from 200° C. to 300° C.

4. The method for making a carbon fiber according to claim 1 wherein the speed at which said precursor fiber is passed through said first oxidation zone is such that the residence time of said precursor fiber within said first oxidation zone is from 10 minutes to 40 minutes and wherein the speed at which said partially oxidized fiber is passed through said final oxidation zone is such that the residence time of said partially oxidized fiber within said final oxidation zone is from 10 minutes to 40 minutes.

5. The method for making a carbon fiber according to claim 1 wherein said ambient air has an ambient air humidity of from 2 to 4 grams of water per kilogram of air.

6. The method for making a carbon fiber according to claim 1 wherein said final oxidation zone comprises a first temperature sub-zone and a second temperature sub-zone wherein said precursor fiber is passed through said first temperature sub-zone of the final oxidation zone before being passed through said second temperature sub-zone of the final oxidation zone and wherein the temperature in said second temperature sub-zone is higher than the temperature in said first temperature subzone.

7. The method for making a carbon fiber according to claim 1 wherein said first oxidation zone comprises a first temperature sub-zone and a second temperature sub-zone wherein said precursor fiber is passed through said first temperature sub-zone of the first oxidation zone before being passed through said second temperature sub-zone of the first oxidation zone and wherein the temperature in said second temperature sub-zone is higher than the temperature in said first temperature subzone.

8. The method for making a carbon fiber according to claim 7 wherein said final oxidation zone comprises a first temperature sub-zone and a second temperature sub-zone wherein said precursor fiber is passed through said first temperature sub-zone of the final oxidation zone before being passed through said second temperature sub-zone of the final oxidation zone and wherein the temperature in said second temperature sub-zone of the final oxidation zone is higher than the temperature in said first temperature subzone of the final oxidation zone.

9. The method for making a carbon fiber according to claim 7 wherein the temperature in said second temperature sub-zone is from 1° C. to 10° C. higher than the temperature in said first temperature sub-zone.

10. The method for making a carbon fiber according to claim 1 wherein at least a second oxidation oven is provided that defines a second oxidation zone wherein the temperature or temperatures in said second oxidation zone fall within a second oxidation zone temperature range which is higher than said first oxidation zone temperature range and lower than said final oxidation zone temperature range, said second oxidation zone having a second oxidation zone atmosphere comprising second oxidation air wherein said second oxidation air enters said second oxidation zone via one or more second oxidation air entrances, said second oxidation zone atmosphere having a second oxidation atmosphere humidity wherein said second oxidation air comprises dehumidified ambient air such that said second oxidation atmosphere humidity is from 1 to 3 grams of water per kilogram of air and wherein said second oxidation atmosphere humidity is at least 1 gram of water per kilogram of air less than said ambient air humidity and wherein said partially oxidized fiber is passed through said second oxidation zone to form a first further oxidized fiber, said first further oxidized fiber being passed through said final oxidation zone to form said oxidized fiber.

11. The method for making a carbon fiber according to claim 10 wherein said first oxidation zone temperature or temperatures, said second oxidation zone temperature or temperatures and said final oxidation zone temperature or temperatures are all in the range of from 200° C. to 300° C.

12. The method for making a carbon fiber according to claim 10 wherein the speed at which said precursor fiber is passed through said first oxidation zone is such that the residence time of said precursor fiber within said first oxidation zone is from 10 minutes to 40 minutes, wherein the speed at which said partially oxidized fiber is passed through said second oxidation zone is such that the residence time of said partially oxidized fiber within said second oxidation zone is from 10 minutes to 40 minutes and wherein the speed at which said first further oxidized fiber is passed through said final oxidation zone is such that the residence time of said first further oxidized fiber within said final oxidation zone is from 10 minutes to 40 minutes.

13. The method for making a carbon fiber according to claim 10 wherein said ambient air has an ambient air humidity of from 2 to 4 grams of water per kilogram of air.

14. The method for making a carbon fiber according to claim 10 wherein at least a third oxidation oven is provided that defines a third oxidation zone wherein the temperature or temperatures in said third oxidation zone fall within a third oxidation zone temperature range which is higher than said second oxidation zone temperature range and lower than said final oxidation zone temperature range, said third oxidation zone having a third oxidation zone atmosphere comprising third oxidation air wherein said third oxidation air enters said third oxidation zone via one or more third oxidation air entrances, said third oxidation zone atmosphere having a third oxidation atmosphere humidity wherein said third oxidation air comprises dehumidified ambient air such that said third oxidation atmosphere humidity is from 1 to 3 grams of water per kilogram of air and wherein said third oxidation atmosphere humidity is at least 1 gram of water per kilogram of air less than said ambient air humidity and wherein said first further oxidized fiber is passed through said third oxidation zone to form a second further oxidized fiber, said second further oxidized fiber being passed through said final oxidation zone to form said oxidized fiber.

15. The method for making a carbon fiber according to claim 14 wherein said first oxidation zone temperature or temperatures, said second oxidation zone temperature or temperatures, said third oxidation zone temperature or temperatures and said final oxidation zone temperature or temperatures are all in the range of from 200° C. to 300° C.

16. The method for making a carbon fiber according to claim 14 wherein the speed at which said precursor fiber is passed through said first oxidation zone is such that the residence time of said precursor fiber within said first oxidation zone is from 10 minutes to 40 minutes, wherein the speed at which said partially oxidized fiber is passed through said second oxidation zone is such that the residence time of said partially oxidized fiber within said second oxidation zone is from 10 minutes to 40 minutes, wherein the speed at which said first further oxidized fiber is passed through said third oxidation zone is such that the residence time of said first further oxidized fiber within said third oxidation zone is from 10 minutes to 40 minutes and wherein the speed at which said second further oxidized fiber is passed through said final oxidation zone is such that the residence time of said second further oxidized fiber within said final oxidation zone is from 10 minutes to 40 minutes.

17. The method for making a carbon fiber according to claim 14 wherein said ambient air has an ambient air humidity of from 2 to 4 grams of water per kilogram of air.

\* \* \* \* \*